United States Patent
Izadi-Zamanabadi et al.

(10) Patent No.: US 9,726,556 B2
(45) Date of Patent: Aug. 8, 2017

(54) METHOD FOR CALIBRATING A TEMPERATURE SENSOR OF A VAPOUR COMPRESSION SYSTEM

(71) Applicant: Danfoss A/S, Nordborg (DK)

(72) Inventors: Roozbeh Izadi-Zamanabadi, Soenderborg (DK); Casper Lindholdt Andersen, Esbjerg (DK)

(73) Assignee: Danfoss A/S, Nordborg (DK)

( * ) Notice: Subject to any disclaimer, the term of this patent is extended or adjusted under 35 U.S.C. 154(b) by 357 days.

(21) Appl. No.: 14/422,412

(22) PCT Filed: Jul. 10, 2013

(86) PCT No.: PCT/DK2013/050234
§ 371 (c)(1),
(2) Date: Feb. 19, 2015

(87) PCT Pub. No.: WO2014/029401
PCT Pub. Date: Feb. 27, 2014

(65) Prior Publication Data
US 2015/0219506 A1     Aug. 6, 2015

(30) Foreign Application Priority Data

Aug. 23, 2012 (DK) .................... 2012 00518

(51) Int. Cl.
*G01K 15/00* (2006.01)
*F25B 49/02* (2006.01)

(52) U.S. Cl.
CPC .......... *G01K 15/005* (2013.01); *F25B 49/02* (2013.01); *F25B 2600/2513* (2013.01); *F25B 2700/21174* (2013.01); *F25B 2700/21175* (2013.01)

(58) Field of Classification Search
CPC .......... G01K 15/005; F25B 2600/2513; F25B 49/02; F25B 2700/21171; F25B 2700/21175
See application file for complete search history.

(56) References Cited

U.S. PATENT DOCUMENTS 8,827,546 B2 * 9/2014 Vonsild ................. F25B 41/062
374/1

FOREIGN PATENT DOCUMENTS

| CN | 101454622 A | 6/2009 |
| CN | 102144136 A | 8/2011 |

(Continued)

OTHER PUBLICATIONS

International Search Report for PCT Serial No. PCT/DK2013/050234 dated Mar. 10, 2014.

(Continued)

*Primary Examiner* — Yu-Hsi D Sun
(74) *Attorney, Agent, or Firm* — McCormick, Paulding & Huber LLP

(57) ABSTRACT

A method for calibrating a temperature sensor arranged in a vapor compression system is disclosed. The opening degree of an expansion device is alternatingly increased and decreased. Simultaneously a temperature of refrigerant entering the evaporator and a temperature of refrigerant leaving the evaporator are monitored. For each cycle of the opening degree of the expansion device, a maximum temperature, $T_{1,\,max}$, of refrigerant entering the evaporator, and a minimum temperature, $T_{2,\,min}$, of refrigerant leaving the evaporator are registered. A calibration value, $\Delta T_1$, is calculated as $\Delta T_1 = C - (T_{2,\,min} - T_{1,\,max})$ for each cycle, and a maximum calibration value, among the calculated values is (Continued)

selected. Finally, temperature measurements performed by the first temperature sensor are adjusted by an amount defined by $\Delta T_{1,\,max}$.

10 Claims, 2 Drawing Sheets

(56) References Cited

FOREIGN PATENT DOCUMENTS

| | | |
|---|---|---|
| EP | 1965158 A2 | 9/2008 |
| EP | 2075515A1 A1 | 7/2009 |
| JP | 2005214509 A | 8/2005 |
| JP | 2008202911 A | 9/2008 |
| WO | 2008/080436 A1 | 7/2008 |
| WO | 2010025728 A1 | 3/2010 |

OTHER PUBLICATIONS

Danish Search Report for Danish Application No. PA 2012 00518 dated Mar. 12, 2013.

* cited by examiner

METHOD FOR CALIBRATING A TEMPERATURE SENSOR OF A VAPOUR COMPRESSION SYSTEM

CROSS-REFERENCE TO RELATED APPLICATION

This application is entitled to the benefit of and incorporates by reference subject matter disclosed in International Patent Application No. PCT/DK2013/050234 filed on Jul. 10, 2013 and Danish Patent Application PA 2012 00518 filed Aug. 23, 2012.

FIELD OF THE INVENTION

The present invention relates to a method for calibrating a temperature sensor arranged in a vapour compression system, such as a refrigeration system, an air condition system or a heat pump. The method of the invention allows a temperature sensor of the vapour compression system, such as a temperature sensor used for determining the superheat of refrigerant leaving the evaporator, to be calibrated in an easy manner.

BACKGROUND

A vapour compression system normally comprises a compressor, a condenser, an expansion device, e.g. in the form of an expansion valve, and an evaporator arranged in a refrigerant path. Refrigerant flowing in the refrigerant path is alternatingly compressed and expanded, and heat exchange takes place in the condenser and in the evaporator. Thereby cooling or heating is provided to a closed volume.

The supply of refrigerant to the evaporator is often controlled on the basis of the superheat of the refrigerant leaving the evaporator. The superheat is the difference between the temperature of the refrigerant leaving the evaporator and the dew point of the refrigerant leaving the evaporator. A high superheat value indicates that the refrigerant leaving the evaporator is gaseous, and that the gaseous refrigerant has been heated in the evaporator. Accordingly, a high superheat value indicates that the potential refrigeration capacity of the evaporator is not utilised in an efficient manner.

On the other hand, zero superheat indicates that liquid refrigerant may be passing through the evaporator and entering the suction line. This is a disadvantage, since it may cause damage to the compressor if liquid refrigerant is allowed to reach the compressor. Therefore it is desirable to operate the vapour compression system in such a manner that the superheat of the refrigerant leaving the evaporator is small, but positive. In order to obtain this, the superheat of the refrigerant leaving the evaporator must be monitored during operation of the vapour compression system. This may, e.g., be done by measuring the temperature of refrigerant entering the evaporator and the temperature of refrigerant leaving the evaporator. As an alternative the temperature and the pressure of refrigerant leaving the evaporator may be measured. In any event, in order to be able to control the vapour compression system to accurately obtain a desired, low superheat value, it is necessary that the sensors used for measuring the temperature and/or pressure of the refrigerant flowing in the refrigerant path are properly calibrated.

JP 2008 202911 discloses a refrigeration apparatus which performs calibration of a refrigerant temperature sensor provided at the inlet and outlet of an evaporator. A control part includes an operation control part for setting the state where the refrigerant is saturated at the inlet and outlet of the evaporator in the operating state of the refrigeration apparatus. A temperature sensor calibration part is arranged to take the detection values of the two refrigerant temperature sensors in the saturation operating state set by the operating control part, and calibrating an error of the refrigerant temperature sensors. A correction control part stores the calibration result of the temperature sensor calibration part, and the detection values of the refrigerant temperature sensors are corrected based on the calibration result. In the method of JP 2008 202911 the evaporator is flooded in order to calibrate the temperature sensors, thereby introducing the risk that liquid refrigerant enters the suction line and reaches the compressor.

SUMMARY

It is an object of embodiments of the invention to provide a method for calibrating a temperature sensor arranged in a vapour compression system, said method allowing easy and accurate calibration of the sensor.

It is a further object of embodiments of the invention to provide a method for calibrating a temperature sensor arranged in a vapour compression system, said method allowing accurate calibration of the sensor, even during operation of the vapour compression system.

It is an even further object of embodiments of the invention to provide a method for calibrating a temperature sensor arranged in a vapour compression system, wherein the method can be performed without flooding the evaporator.

The present invention provides a method for calibrating a temperature sensor arranged in a vapour compression system, the vapour compression system comprising a compressor, a condenser, an expansion device having a variable opening degree, and an evaporator arranged along a refrigerant path, the vapour compression system further having a first temperature sensor, $S_1$, arranged in the refrigerant path at an inlet opening of the evaporator, and a second temperature sensor, $S_2$, arranged in the refrigerant path at an outlet opening of the evaporator, the method comprising the steps of:

alternatingly increasing and decreasing the opening degree of the expansion device between a maximum opening degree and a minimum opening degree, thereby defining a plurality of cycles of the opening degree of the expansion device, at least for a part of each cycle of the opening degree of the expansion device, monitoring a temperature of refrigerant entering the evaporator by means of the first temperature sensor, $S_1$, and monitoring a temperature of refrigerant leaving the evaporator by means of the second temperature sensor, $S_2$, for each cycle of the opening degree of the expansion device, registering a maximum temperature, $T_{1,\,max}$, measured by the first temperature sensor, $S_1$, and registering a minimum temperature, $T_{2,\,min}$, measured by the second temperature sensor, $S_2$, for each cycle of the opening degree of the expansion device, calculating a calibration value, $\Delta T_1$, as $\Delta T_1 = C - (T_{2,\,min} - T_{1,\,max})$, where C is a constant, selecting a maximum calibration value, $\Delta T_{1,\,max}$, among the calibration values, $\Delta T_1$, calculated for each of the plurality of cycles of the opening degree of the expansion device, and adjusting temperature measurements performed by the first temperature sensor, $S_1$, by an amount defined by $\Delta T_{1, max}$.

The method of the present invention relates to calibration of a temperature sensor. Thus, by means of the method of the present invention it can be ensured that the temperature measurements performed by means of the temperature sensor being calibrated are accurate and reliable.

The temperature sensor is arranged in a vapour compression system. In the present context the term 'vapour compression system' should be interpreted to mean any system in which a flow of fluid medium, such as refrigerant, circulates and is alternatingly compressed and expanded, thereby providing either cooling or heating of a volume. Thus, the vapour compression system may be a refrigeration system, an air condition system, a heat pump, etc. The vapour compression system, thus, comprises a compressor, a condenser, an expansion device, e.g. in the form of an expansion valve, and an evaporator, arranged along a refrigerant path.

The compressor may be in the form of a single compressor, e.g. a fixed speed compressor, a two stage compressor or a variable speed compressor. Alternatively, the compressor may be in the form of a compressor rack comprising two or more individual compressors. Each of the compressors in the compressor rack could be a fixed speed compressor, a two stage compressor or a variable speed compressor.

The expansion device is of a kind which has a variable opening degree. Thus, by adjusting the opening degree of the expansion device, the flow of refrigerant which is supplied to the evaporator can be controlled.

The evaporator may be in the form of a single evaporator comprising a single evaporator coil or two or more evaporator coils arranged in parallel. As an alternative, the evaporator may comprise two or more evaporators arranged in parallel in the refrigerant path.

The vapour compression system further comprises a first temperature sensor, $S_1$, arranged in the refrigerant path at an inlet opening of the evaporator, and a second temperature sensor, $S_2$, arranged in the refrigerant path at an outlet opening of the evaporator. Thus, by means of the temperature sensors, $S_1$ and $S_2$, it is possible to measure the temperature of refrigerant entering the evaporator and the temperature of refrigerant leaving the evaporator.

According to the method of the invention, the opening degree of the expansion device is initially alternatingly increased and decreased between a maximum opening degree and a minimum opening degree. Thereby a plurality of cycles of the opening degree of the expansion device is defined, i.e. at least two cycles, such as 4-5 cycles, or even more cycles. The opening degree of the expansion device may be increased and decreased in a gradual manner, e.g. defining a substantially sinusoidal or triangular pattern of the opening degree as a function of time. As an alternative, the opening degree may be abruptly shifted from the maximum opening degree to the minimum opening, and shifted abruptly back to the maximum opening degree after a certain time period.

It should be noted that one cycle of the opening degree is a full period of increasing and decreasing the opening degree of the expansion device, e.g. from the maximum opening degree is reached until the next time the maximum opening degree is reached.

During the alternatingly increasing and decreasing of the opening degree of the expansion device, a temperature of refrigerant entering the evaporator is monitored by means of the first temperature sensor, $S_1$. Similarly, a temperature of refrigerant leaving the evaporator is monitored by means of the second temperature sensor, $S_2$. The monitoring of the temperatures takes place at least for a part of each cycle of the opening degree of the expansion device. Thus, the monitoring may take place during the entire duration of each cycle. Alternatively, the monitoring may only take place during a part of the duration of each cycle, e.g. only when the opening degree of the expansion device is below a certain level.

Next, for each cycle of the opening degree of the expansion device, a maximum temperature, $T_{1, max}$, and a minimum temperature, $T_{2, min}$, are registered. The maximum temperature, $T_{1, max}$, is the maximum temperature which is measured by the first temperature sensor, $S_1$, during the cycle in question. The minimum temperature, $T_{2, min}$, is the minimum temperature which is measured by the second temperature sensor, $S_2$, during the cycle in question.

Next, a calibration value, $\Delta T_1$, is calculated for each cycle of the opening degree of the expansion device. $\Delta T_1$ is calculated as $\Delta T_1 = C - (T_{2, min} - T_{1, max})$, where C is a constant. Thus, the calibration value, $\Delta T_1$, is a measure for how close the difference between the minimum temperature measured by the second temperature sensor, and the maximum temperature measured by the first temperature sensor is to the constant value, C, for a given cycle.

When the filling degree of the evaporator is maximum, i.e. when liquid refrigerant is present throughout the entire evaporator, the temperature of the refrigerant entering the evaporator is close to the temperature of the refrigerant leaving the evaporator. Thus, in this case the temperature difference between the temperature measured by means of the first temperature sensor, $S_1$, and the temperature measured by means of the second temperature sensor, $S_2$, is small. When the filling degree is smaller, i.e. when gaseous refrigerant is present in a region near the outlet opening of the evaporator, the temperature of the refrigerant leaving the evaporator is higher than the temperature of the refrigerant entering the evaporator. Thus, in this case the temperature measured by means of the first temperature sensor, $S_1$, is lower than the temperature measured by means of the second temperature sensor, $S_2$.

When the opening degree of the expansion device is increased, the supply of refrigerant to the evaporator is increased. Thereby the filling degree of the evaporator is also increased. Similarly, when the opening degree of the expansion device is decreased, the supply of refrigerant to the evaporator is decreased. Thereby the filling degree of the evaporator is also decreased. Accordingly, when the opening degree of the expansion device is alternatingly increased and decreased as described above, the filling degree of the evaporator is also alternatingly increased and decreased. Preferably, the filling degree is alternatingly increased and decreased between a maximum filling degree corresponding to a flooded state of the evaporator, i.e. a state in which liquid refrigerant is present throughout the entire evaporator, and lower filling degrees, where gaseous refrigerant is present in a region near the outlet opening of the evaporator. Therefore, as described above, the temperatures measured by the temperature sensors, $S_1$ and $S_2$, will also increase and decrease.

Furthermore, when the opening degree of the expansion device is low, the mass flow of refrigerant towards the evaporator is low. This results in a low pressure of the refrigerant being supplied to the evaporator. This has the consequence that the temperature of the refrigerant being supplied to the evaporator is also low. Similarly, when the opening degree of the expansion device is high, the mass flow of refrigerant towards the evaporator is high. This results in a high pressure and, consequently, a high temperature of the refrigerant being supplied to the evaporator. Consequently, when the opening degree of the expansion device is decreased, the temperature of the refrigerant being supplied to the evaporator is increased, and when the opening degree of the expansion device is increased, the temperature of the refrigerant being supplied to the evaporator in decreased.

Thus, for each cycle of the opening degree of the expansion device, the temperatures measured by the first temperature sensor, $S_1$, and the second temperature sensor, $S_2$, will reach a maximum value and a minimum value. As described above, at maximum filling degree of the evaporator, the temperature of the refrigerant entering the evaporator is at a maximum, and the temperature of the refrigerant leaving the evaporator is at a minimum. Furthermore, in this case the temperature difference between the temperature of the refrigerant leaving the evaporator and the temperature of the refrigerant entering the evaporator represents the optimal superheat value. Thus, by finding these maximum and minimum temperature values, and comparing the difference between the found temperature values to the optimal superheat value, a calibration of one of the temperature sensors relative to the other temperature sensor can be obtained.

As an alternative, $\Delta T_1$ could be calculated in the following manner. For each cycle, the temperature difference, $T_2-T_1$, is monitored, i.e. temperature differences occurring at any given time, or at selected points in time, during the cycle are obtained. Then the minimal temperature difference, $\min(T_2-T_1)$ is selected. Finally, $\Delta T_1$ is calculated as $\Delta T_1=C-\min(T_2-T_1)$. This approach may be appropriate in the case that the evaporator is relatively short, while the approach described above may be appropriate for longer evaporators.

According to the present invention, a maximum calibration value, $\Delta T_{1,max}$, is selected among the calibration values, $\Delta T_1$, calculated for each of the plurality of cycles of the opening degree of the expansion valve. By repeating the increase and decrease in opening degree of the expansion device, and selecting the maximum calibration value, i.e. the calibration value corresponding to the situation where the temperature difference between $T_{2,min}$ and $T_{1,max}$ is minimal, it is ensured that a true flooded state, i.e. a state of optimal superheat value, is selected for the calibration process.

Finally, the temperature measurements performed by the first temperature sensor, $S_1$, are subsequently adjusted by an amount defined by $\Delta T_{1,max}$. Thereby the first temperature sensor, $S_1$, has been calibrated relative to the second temperature sensor, $S_2$, and subsequent measurements of the superheat value are reliable.

The step of alternatingly increasing and decreasing the opening degree of the expansion device may be performed on the basis of measurements performed by the second temperature sensor, $S_2$. When the filling degree of the evaporator reaches maximum, the temperature of the refrigerant leaving the evaporator will decrease significantly. A significant decrease in the temperature measured by means of the second temperature sensor may therefore indicate that such a situation has been reached. The opening degree of the expansion valve may therefore be controlled in such a manner that the maximum opening degree is selected as long as the filling degree is smaller than maximum. When a significant decrease in the temperature measured by the second temperature sensor is detected, the opening degree of the expansion device may be decreased to the minimum opening degree, where it is maintained for a certain period of time before it is once again increased to the maximum opening degree. For instance, the opening degree may be increased when a significant increase in the temperature measured by means of the second temperature sensor, $S_2$, is detected. As an alternative, a fixed time interval may simply be allowed to lapse before the opening degree is increased.

Thus, the step of monitoring a temperature of refrigerant leaving the evaporator may comprise monitoring a dynamical behaviour of the temperature of refrigerant leaving the evaporator, and the step of alternatingly increasing and decreasing the opening degree of the expansion device may be performed on the basis of the dynamical behaviour of the temperature of the refrigerant leaving the evaporator. The dynamical behaviour of the temperature of refrigerant leaving the evaporator may be the significant decrease described above, indicating that a situation of maximum filling degree of the evaporator has been reached.

The method may further comprise the step of repeating the method steps after a period of time has elapsed. A temperature sensor may be subject to temperature drift, and it may therefore be desirable to repeat the calibration procedure after a while, e.g. at regular time intervals. This can be easily done by means of the method of the present invention, since the calibration is performed by means of sensors which are already present in the vapour compression system.

Other reasons for performing calibration of temperature sensors, either initially or as a repeated process as described above, could be as follows.

The temperature sensor, $S_1$, may be arranged in a non-optimal position. For instance, it may be attached to a refrigerant pipe at a relatively long distance from the inlet of the evaporator. In the case that the pipe is not properly insulated, there is a risk that substantial heat exchange takes place, which will affect the actual evaporation temperature. This must be compensated for in the temperature measurement performed by the temperature sensor.

As another example, the physical structure of the evaporator, such as the dimensions or size of the evaporator, may cause a substantial pressure drop across the evaporator, i.e. from the inlet opening of the evaporator to the outlet opening of the evaporator. This will generate a bias in temperature measurements performed by means of the temperature sensor, and this bias must be compensated for.

As yet another example, a measurement bias may be present in cases where the applied refrigerant is a blend of different refrigerants, which causes a temperature glide across the evaporator. This temperature glide must also be compensated for.

According to one embodiment, the constant C may correspond to a superheat value of refrigerant leaving the evaporator during a flooded condition of the evaporator. This may be referred to as the optimal superheat value. The optimal superheat value depends on the type of vapour compression system and on the type of refrigerant used. However, for a given type of vapour compression system and a given type of refrigerant, the optimal superheat value can be determined, and this value can subsequently be used for all identical vapour compression systems applying the same refrigerant. A typical optimal superheat value could be approximately 1-2 K.

BRIEF DESCRIPTION OF THE DRAWINGS

The invention will now be described in further detail with reference to the accompanying drawings in which.

DETAILED DESCRIPTION

Figure 1:
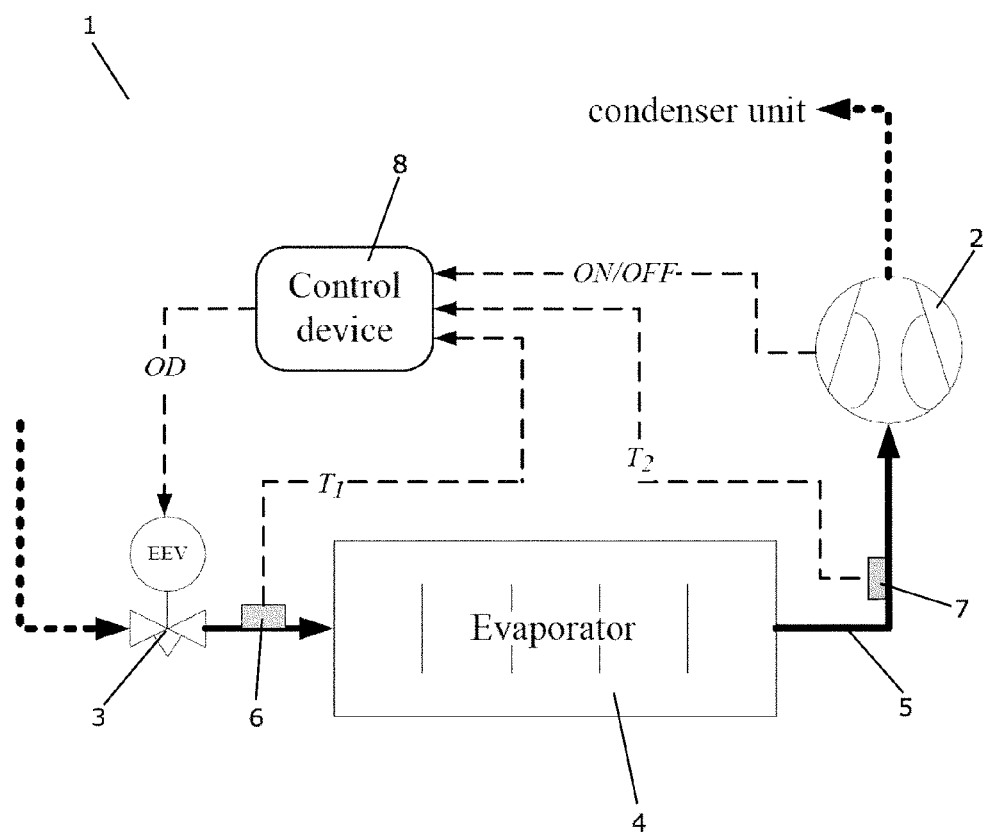
FIG. 1 is a diagrammatic view of a part of a vapour compression system used for performing the method according to an embodiment of the invention.

FIG. 1 is a diagrammatic view of a part of a vapour compression system 1. The vapour compression system 1 comprises a compressor 2, a condenser (not shown), an expansion device 3, in the form of an electronic expansion valve (EEV), and an evaporator 4, arranged along a refrigerant path 5. A first temperature sensor 6 is arranged in the refrigerant path 5 at an inlet opening of the evaporator 4, and a second temperature sensor 7 is arranged in the refrigerant path 5 at an outlet opening of the evaporator 4. Thus, the first temperature sensor 6 measures the temperature, $T_1$, of refrigerant entering the evaporator 4, and the second temperature sensor 7 measures the temperature, $T_2$, of refrigerant leaving the evaporator 4.

The temperature signals, $T_1$ and $T_2$, are communicated to a control device 8 with the purpose of controlling the opening degree of the expansion device 3 in such a manner that an optimal superheat value is obtained. Accordingly, the control device 8 is adapted to generate and supply a control signal to the expansion device 3.

Furthermore, the control device 8 receives an ON/OFF signal from the compressor 2 indicating whether the compressor is operating or not. This information is also taken into account when the control signal to the expansion device 3 is generated.

The first temperature sensor 6 can be calibrated in the manner described above. This will be described further below with reference to FIG. 2.

Figure 2:
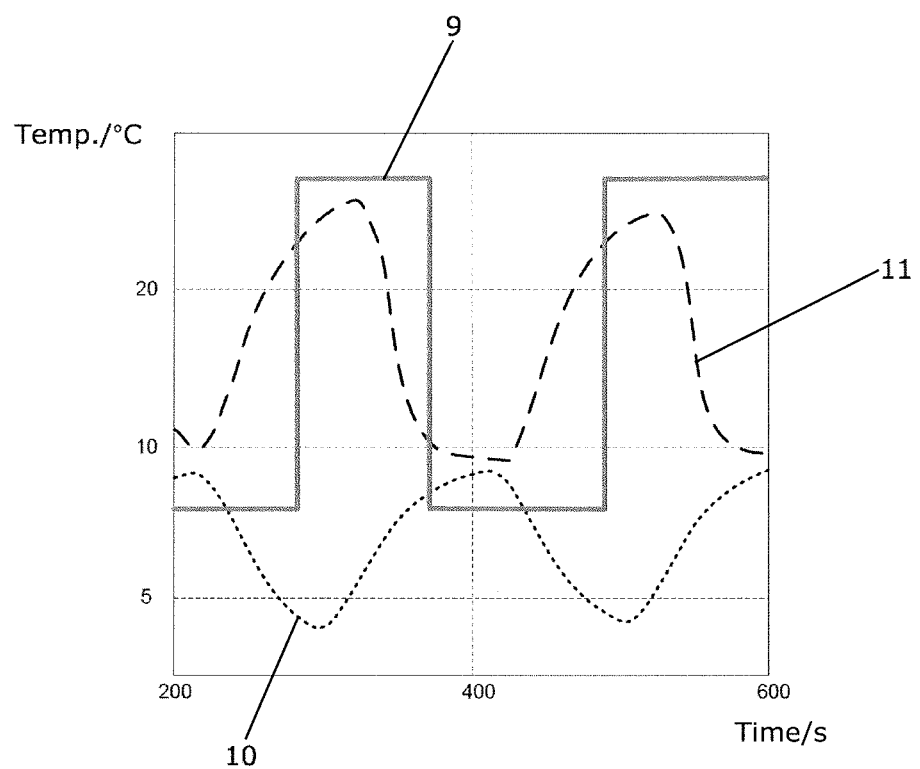
FIG. 2 is a graph illustrating temperature variations of refrigerant during alternatingly increasing and decreasing the opening degree of an expansion device.

FIG. 2 is a graph illustrating temperature variations of refrigerant during alternatingly increasing and decreasing the opening degree of an expansion device. The graph of FIG. 2 may, e.g., be obtained by measurements performed by the temperature sensors 6, 7 shown in FIG. 1.

In the graph of FIG. 2, the opening degree of an expansion device, e.g. the expansion device 3 illustrated in FIG. 1, as a function of time is illustrated by solid line 9. It can be seen that the opening degree 9 is alternated between a maximum opening degree and a minimum opening degree, and that the opening degree 9 is switched abruptly between the maximum and minimum opening degrees. This is repeated, and a plurality of cycles of the opening degree 9 of the expansion device is thereby defined. Approximately 1½ cycle is shown in FIG. 2.

While the opening degree 9 of the expansion device is alternated as described above, the temperature of refrigerant entering the evaporator and the temperature of refrigerant leaving the evaporator are measured, e.g. by means of the temperature sensors 6, 7 illustrated in FIG. 1. The dotted line 10 in FIG. 2 illustrates the temperature of refrigerant entering the evaporator, i.e. the temperature measured by means of the first temperature sensor 6, as a function of time. The dashed line 11 illustrates the temperature of refrigerant leaving the evaporator, i.e. the temperature measured by means of the second temperature sensor 7, as a function of time.

In the graph of FIG. 2, the opening degree 9 of the expansion device is initially at the minimum opening degree. Accordingly, the supply of refrigerant to the evaporator is low, and the filling degree of the evaporator will therefore gradually decrease. Furthermore, the pressure of the refrigerant entering the evaporator is low. As a consequence, the temperature 10 of the refrigerant entering the evaporator decreases, as described above. Furthermore, the temperature 11 of the refrigerant leaving the evaporator increases, since an increasing part of the evaporator will contain gaseous refrigerant, and therefore an increasing part of the heat exchange taking place in the evaporator will be used for heating gaseous refrigerant, instead of for evaporating refrigerant.

At a certain point in time, the opening degree 9 of the expansion device is switched to the maximum opening degree. Thereby the supply of refrigerant to the evaporator is increased significantly, thereby increasing the mass flow of refrigerant towards the evaporator and increasing the pressure of the refrigerant entering the evaporator. The increased supply of refrigerant to the evaporator furthermore causes the filling degree of the evaporator to increase.

Thus, the increase in opening degree 9 of the expansion device causes the temperature 10 of the refrigerant entering the evaporator to increase. Furthermore, the increase in opening degree 9 of the expansion device causes the temperature 11 of the refrigerant leaving the evaporator to decrease. Accordingly, the temperature 10 of refrigerant entering the evaporator and the temperature 11 of refrigerant leaving the evaporator approach each other.

At a later point in time, the opening degree 9 of the expansion device is once again switched to the minimum opening degree. Thereby the supply of refrigerant to the evaporator is decreased significantly, thereby decreasing the mass flow of refrigerant towards the evaporator and decreasing the pressure of the refrigerant entering the evaporator. The decreased supply of refrigerant to the evaporator furthermore causes the filling degree of the evaporator to increase towards the maximum filling degree.

Thus, the decrease in opening degree 9 of the expansion device causes the temperature 10 of the refrigerant entering the evaporator to decrease. Furthermore, the decrease in opening degree 9 of the expansion device causes the temperature 11 of the refrigerant leaving the evaporator to increase. Accordingly, the temperature difference between the temperature 11 of the refrigerant leaving the evaporator and the temperature 10 of the refrigerant entering the evaporator is increased.

The alternating increase and decrease in opening degree 9 of the expansion device is repeated a desired number of times, thereby defining a plurality of cycles of the opening degree of the expansion device. This results in the temperatures 10, 11 of the refrigerant entering and leaving the evaporator being alternatingly increased and decreased as described above. Accordingly, for each of the cycles of the opening degree 9 of the expansion device the temperature 10 of the refrigerant entering the evaporator reaches a maximum value, and the temperature 11 of the refrigerant leaving the evaporator reaches a minimum value. This will occur almost simultaneously, with the temperature 10 of the refrigerant entering the evaporator reaching its maximum value shortly before the temperature 11 of the refrigerant leaving the evaporator reaching its minimum value, due to the time it takes for the refrigerant to pass the evaporator. This event indicates that the evaporator has reached a flooded state or maximum filling degree, and the temperature difference between the minimum temperature 11 of the refrigerant leaving the evaporator and the maximum temperature 10 of the refrigerant entering the evaporator corresponds to the superheat value in this state.

Therefore, for each cycle of the opening degree 9 of the expansion device, a calibration value, $\Delta T_1$, can be calculated as $\Delta T_1 = C - (T_{2,\,min} - T_{2,\,max})$, where C is a constant corresponding to the superheat value in a flooded state of the evaporator, $T_{2,\,min}$ is the minimum value of the temperature 11 of the refrigerant leaving the evaporator, and $T_{1,\,max}$ is the maximum value of the temperature 10 of the refrigerant entering the evaporator. Thus, $\Delta T_1$ represents the difference between the actual superheat value and the measured superheat value, and is therefore a measure for a misreading or bad calibration of the temperature sensors relative to each other.

Among the calculated calibration values a maximum value, $\Delta T_{1,\,max}$, is selected. Thereby it is ensured that the calibration value which is selected represents the situation where the evaporator is actually in a flooded state, and the calibration value thereby truly reflects the possible misreading of the temperature sensors.

Finally, the subsequent temperature measurements performed by the first temperature sensor, i.e. the temperature sensor measuring the temperature 10 of refrigerant entering the evaporator, are adjusted by an amount corresponding to $\Delta T_{1,\,max}$. Thereby the superheat values which are subsequently determined based on measurements performed by means of the first and second temperature sensors will be accurate, and an accurate control of the expansion device can thereby be obtained.

The embodiments of the invention described above are provided by way of example only. The skilled person will be aware of many modifications, changes and substitutions that could be made without departing from the scope of the present invention. The claims of the present invention are intended to cover all such modifications, changes and substitutions as fall within the spirit and scope of the invention.

What is claimed is:

1. A method for calibrating a temperature sensor arranged in a vapour compression system, the vapour compression system comprising a compressor, a condenser, an expansion device having a variable opening degree, and an evaporator arranged along a refrigerant path, the vapour compression system further having a first temperature sensor, $S_1$, arranged in the refrigerant path at an inlet opening of the evaporator, and a second temperature sensor, $S_2$, arranged in the refrigerant path at an outlet opening of the evaporator, the method comprising the steps of:
   alternatingly increasing and decreasing the opening degree of the expansion device between a maximum opening degree and a minimum opening degree, thereby defining a plurality of cycles of the opening degree of the expansion device,
   at least for a part of each cycle of the opening degree of the expansion device, monitoring a temperature of refrigerant entering the evaporator by means of the first temperature sensor, $S_1$, and monitoring a temperature of refrigerant leaving the evaporator by means of the second temperature sensor, $S_2$,
   for each cycle of the opening degree of the expansion device, registering a maximum temperature, $T_{1,\,max}$, measured by the first temperature sensor, $S_1$, and registering a minimum temperature, $T_{2,\,min}$, measured by the second temperature sensor, $S_2$,
   for each cycle of the opening degree of the expansion device, calculating a calibration value, $\Delta T_1$, as $\Delta T_1 = C - (T_{2,\,min} - T_{1,\,max})$, where C is a constant,
   selecting a maximum calibration value, $\Delta T_{1,\,max}$, among the calibration values, $\Delta T_1$, calculated for each of the plurality of cycles of the opening degree of the expansion device, and
   adjusting temperature measurements performed by the first temperature sensor, $S_1$, by an amount defined by $\Delta T_{1,\,max}$.

2. The method according to claim 1, wherein the step of alternatingly increasing and decreasing the opening degree of the expansion device is performed on the basis of measurements performed by the second temperature sensor, $S_2$.

3. The method according to claim 2, wherein the step of monitoring a temperature of refrigerant leaving the evaporator comprises monitoring a dynamical behaviour of the temperature of refrigerant leaving the evaporator, and wherein the step of alternatingly increasing and decreasing the opening degree of the expansion device is performed on the basis of the dynamical behaviour of the temperature of the refrigerant leaving the evaporator.

4. The method according to claim 3, further comprising the step of repeating the method steps after a period of time has elapsed.

5. The method according to claim 3, wherein C corresponds to a superheat value of refrigerant leaving the evaporator during a flooded condition of the evaporator.

6. The method according to claim 2, further comprising the step of repeating the method steps after a period of time has elapsed.

7. The method according to claim 2, wherein C corresponds to a superheat value of refrigerant leaving the evaporator during a flooded condition of the evaporator.

8. The method according to claim 1, further comprising the step of repeating the method steps after a period of time has elapsed.

9. The method according to claim 8, wherein C corresponds to a superheat value of refrigerant leaving the evaporator during a flooded condition of the evaporator.

10. The method according to claim 1, wherein C corresponds to a superheat value of refrigerant leaving the evaporator during a flooded condition of the evaporator.

* * * * *